United States Patent Office 3,182,086
Patented May 4, 1965

3,182,086
CATALYTIC HYDROGENATION OF NITROS-
AMINES TO HYDRAZINES
Dewey Robert Levering, Fairfax, Wilmington, and Lucien
G. Maury, Brookside, Newark, Del., assignors to
Hercules Powder Company, Wilmington, Del., a corporation of Delaware
No Drawing. Filed July 20, 1955, Ser. No. 523,376
9 Claims. (Cl. 260—583)

This invention relates to a process for the preparation of hydrazines and more particularly to a process whereby hydrazines are produced by the catalytic hydrogenation of the corresponding nitrosamine.

Hydrazine and dialkylhydrazines have been used to some extent as reducing agents, antioxidants, chlorine and oxygen scavengers and as chemical intermediates. Dimethylhydrazine has recently become an important commercial chemical in the rocket fuel field and in fact exhibits some advantages over hydrazine itself in this use. Regrettably, there is not presently existing an economical method of preparing hydrazines. It is known that hydrazine derivatives are formed by the chemical reduction of the corresponding nitrosamines. The usual chemical reducing agent employed is zinc and acetic acid. In this reaction yields are about 70% of the theoretical. With stronger reducing agents, such as tin and mineral acids, the hydrazines are further reduced and the reaction products are secondary amines and ammonia. With agents such as lithium aluminum hydride about 75% yields of the corresponding hydrazines are obtainable. However, all of these chemical reducing methods require expensive reducing agents and the recovery of the hydrazine from the product mixture is difficult because dilute solutions must be employed if yields are to be acceptable.

It is also known that nitrosamines may be electrolytically reduced to the corresponding hydrazines in 70-95% yields. Electrolytic reduction, however, is expensive and again the hydrazine must be isolated from a dilute solution. Moreover, the reactor capacity (space-time yield) is undesirably low in the electrolytic process. Consequently, a new and economical process for the production of hydrazine derivatives is highly desirable.

Now in accordance with the present invention it has been found that nitrosamines may be catalytically hydrogenated to the corresponding hydrazine economically and in good yield. Generally described the invention is a process for preparing hydrazines which comprises treating a nitrosamine with hydrogen at a pressure above atmospheric in the presence of particulate catalytic material comprising a Group 8 metal selected from the group consisting of palladium, platinum, rhodium, nickel, cobalt and iridium, said catalytic material having specific surface area of at least about 15 square meters per gram. Preferably a hydrogen pressure of between about 50 and 10000 p.s.i.g. and a temperature of from about 20° to 75° C. will be employed. From the standpoint of high yield, palladium is the preferred metal and desirably will be employed on a high specific surface support such as carbon, alumina, silica, silica-alumina, titania, etc. Platinum either employed as platinum oxide or as platinum supported on carbon is nearly as effective as palladium. Nickel, although as active in promoting the hydrogenation of the nitrosamine as either palladium or platinum, also is inclined to effect considerable decomposition of the hydrazine product to the corresponding amine, thereby necessitating closer reaction control. Rhodium, cobalt and iridium, while operable, are not as effective catalytic agents as palladium, platinum and nickel.

The nitrosamines employed as the starting material in the catalytic hydrogenation of the invention are preferably produced by the nitrosation of the corresponding secondary amine with nitric oxide in accordance with the process described in the copending application, Serial No. 467,227, filed November 5, 1954, now U.S. Patent No. 3,090,786, issued May 21, 1963. The nitrosamines may be dialkyl-, diaryl-, mixed alkylaryl- or heterocyclicnitrosamines, or the nitrosamine may contain more than one nitroso group, in which case the N,N'-diaminocompound can be obtained. The nitrosamine may also contain other substituents such as carboxyl, hydroxyl or ester groups. Specific examples of such nitrosamines are:

N,N-dimethylnitrosamine
N,N-dipropylnitrosamine
N,N-dibutylnitrosamine
N-methyl-N-ethylnitrosamine
N-methyl-N-isopropylnitrosamine
N-ethyl-N-tertiarybutylnitrosamine
N-methyl-N-hexylnitrosamine
N,N-diamylnitrosamine
N,N-dioctylnitrosamine
N-ethyl-N-decylnitrosamine
N-methoxyethyl-N-methylnitrosamine
N-methyl-N-cyclohexylnitrosamine
N-propyl-N-cyclohexylnitrosamine
N-cyclohexyl-N-heptylnitrosamine
N,N-dicyclohexylnitrosamine
N-methyl-N-abietylnitrosamine
N-methyl-N-dehydroabietylnitrosamine
N-methyl-N-hydronitrosamine
N,N-bis(abietyl)nitrosamine
N,N-bis(dehydroabietyl)nitrosamine
N,N-distearylnitrosamine
N-methyl-N-phenylnitrosamine
N-ethyl-N-phenylnitrosamine
N-isopropyl-N-phenylnitrosamine
N-tert-butyl-N-phenylnitrosamine
N-methyl-N-(4-aminophenyl)nitrosamine
N-methyl-N-(1-naphthyl)nitrosamine
N,N-diphenylnitrosamine
N-methyl-N-benzylnitrosamine
N-phenyl-N-benzylnitrosamine
N-methyl-N-phenethylnitrosamine
N-methyl-N-furfurylnitrosamine
N-methyl-N-(2-furyl)nitrosamine
N-nitrosopiperidine
N-nitrosopyrroline
N-nitrosopyrrolidine
N-nitrosoindole
N-nitrosocarbazole
N-nitrosooxazine
N-nitrosomorpholine
Mono- and di-N-nitroso-N,N'-dimethylethylenediamines
Mono- and di-N-nitroso-N,N'-dimethyl o- and p-phenylenediamines
Mono- and di-N-nitrosopiperizines It is also desirable, as will be hereinafter illustrated, that the starting nitrosamine be purified by fractionation, solvent extraction, recrystallization, or other known means, in order to remove an unidentified impurity which is believed to be the result of some type of oxidation reaction. Although purification may be effected by a simple distillation, for best results it is desired that a fractionation be carried out in a column having at least four theoretical plates or that equivalent purification be obtained by other means.

Although a solvent is not necessary, it is preferred that the hydrogenation reaction be carried out in the presence of a liquid which is inert with respect to both the nitrosamine and the product hydrazine. It is especially preferred to conduct the reaction in aqueous medium when possible. The lower nitrosamines generally are soluble in water as are their corresponding hydrazine products.

| Example | Nitrosamine | Catalyst | Catalyst concentration (percent) | Pressure (p.s.i.g.) | Temperature (°C.) | Time (hours) | Percent conversion a | Percent yield b | Zero order rate constant h | Catalyst surface area (sq.m./g.) | Type of reactor | Nitrosamine purity | Reaction medium |
|---|---|---|---|---|---|---|---|---|---|---|---|---|---|
| 1 | DMNA | PtO₂ | 12 | 1,400–1,600 | Room | 7 | 88 | 88 | 0.15 | 40 | Rocking | Pure | Water, 200%. |
| 2 | DMNA | PtO₂ | 3 | 55–60 | do | 8 | 49 | 75 | .043 | 40 | Parr | do | Do. |
| 3 | DMNA | Ni "R" | 10 | 55–60 | 35° | 2.8 | 61 | 16 | .23 | 50 | do | do | Do. |
| 4 | DMNA | Ni "R" | 6 | 3,600–4,000 | Room | 3.9 | 100 | 55 | .52 | 50 | Rocking | do | Do. |
| 5 | DMNA | Pt/C | 6 | 55–60 | do | 3.8 | 100 | 87 | .53 | 1,000 | Parr | do | Do. |
| 6 | DMNA | Pd/C | 6 | 55–60 | do | 2.5 | 77 | 85 | .30 | 900 | do | do | Do. |
| 7 | DMNA | Rh/C | 6 | 55–60 | do | 3.6 | 84 | 26 | .38 | 900 | do | do | Do. |
| 8 | DMNA | Ru/C | 6 | 55–60 | do | 2.3 | 0 | 6 | .00 | 900 | do | do | Do. |
| 9 | DMNA | KReO₄ | 3 | 55–60 | do | 4.7 | 0 | 0 | .00 | | do | do | Do. |
| 10 | DMNA | Pd/C | 6 | 3,800–4,000 | do | 0.7 | 100 | 89 | 1.3 | 1,000 | Rocking | do | Do. |
| 11 | DMNA | Rh/C | 6 | 1,300–1,500 | do | 2.5 | 100 | 88 | 1.0 | 900 | do | do | Do. |
| 12 | DMNA | Pd/C | 18 | 3,800–4,000 | do | 1.8 | 100 | 47 | 1.6 | 1,000 | do | do | Do. |
| 13 | DMNA | Pd/C | 1.5 | 50–60 | do | 1.9 | 66 | 71 | 0.56 | 1,000 | Parr | do | Do. |
| 14 | DMNA | Pd/C | 8 | 15–20 | do | 2.3 | 38 | 80 | .44 | 1,000 | do | do | Do. |
| 15 | DENA | Pd/C | 8 | 5,800–6,000 | 60° | 9.5 | 50 | 79 | .21 | 1,000 | do | do | Anhydrous ETOH, 300%. |
| 16 | NP | Pd/C | 9 | 4,600–5,000 | Room | 4.0 | 80 | 80 | 0.47 | 1,000 | Rocking | Impure | Absolute ETOH, 200%. |
| 17 | DMNA | Pd/C | 6 | 900–1,000 | do | 4.5 | 94 | 90 | | 1,000 | do | Pure | Do. |
| 18 | DMNA | Pd/C | 5 | 3,800–4,000 | do | 14.0 | 60 | 73 | | 1,000 | do | Impure | Absolute ETOH, 500%. |
| 19 | DMNA | Pd/C | 4 | 5,800–6,000 | do | 8.0 | 95 | 90 | 0.05 | 1,000 | do | do | None. |
| 20 | DMNA | Pd/C | 8 | 1,300–1,500 | do | 2.7 | 100 | 90 | 7.4 | 1,000 | do | Pure | Toluene, 300%. |
| 21 | DMNA | Pd/C | 12 | 4,000–6,000 | do | 3.5 | 100 | 86 | .22 | 1,000 | do | do | Water, 300%. |
| 22 | DENA | Pd/C | 4 | 55–60 | do | 3.5 | 78 | 96 | .14 | 1,000 | Parr | do | Water, 140%. |
| 23 | DENA | Pd/C | 4 | 55–60 | do | 0.85 | 49 | 80 | .40 | 1,000 | do | Impure | Do. |
| 24 | DMNA | Pd/C | 6 | 55–60 | do | 5.0 | 34 | 45 | .11 | 1,000 | do | Impure | Do. |
| 25 a | DMNA | Pd/CaCO₃ | 6 | 55–00 | do | 3.0 | 55 | | .41 | | do | Impure | Do. |
| 25 b | DMNA | Pd/CaCO₃ | 6 | 55–60 | do | 8.3 | 88 | | .097 | | do | Pure | Water, 200%. |
| 26 | DMNA | Pd/CaCO₃ | 6 | 55–60 | do | 44 | 63 | 97 | .0061 | | do | do | Do. |
| 27 | DMNA | Pd/C | 6 | 55–60 | do | 66 | 1.7 | 83 | .0049 | 2.2 | do | do | Do. |
| 28 | DMNA | Pd/C | 6 | 1–2 | do | 16 | 3.2 | 40 | .019 | 2.2 | do | do | Do. |
| 29 | DMNA | Pd/C | 6 | 3,800–4,000 | do | 24 | 30.6 | 50 | .00 | 2.2 | Rocking | do | Do. |
| 30 | DMNA | Pd/C | 6 | 55–60 | do | 1.9 | 0 | 93 | .084 | 1,000 | Parr | do | Do. |
| 31 | DMNA | Pd/C | 6 | 55–60 | do | 4.0 | 10 | 55 | .24 | 1,000 | do | (c) | Do. |
| 32 | DMNA | Pd/C | 6 | 1–2 | do | 16.8 | 27 | 52 | .032 | 1,000 | do | (d) | Do. |
| 33 | DMNA | Pd/C | 6 | 1–2 | do | 6.0 | 3.9 | 53 | .066 | 1,000 | do | (c) | Do. |
| 34 | DMNA | Pd/C | 6 | 1–2 | do | 8.3 | 20 | 90 | .097 | 1,000 | do | (d) | Do. |
| 35 | DMNA | Pd/C | 6 | 1–2 | do | 13 | 63 | 90 | .054 | 1,000 | do | (e) | Do. |
| 36 | DMNA | Pd/C | 6 | 1–2 | do | 4.3 | 4.3 | 48 | .010 | 1,000 | do | (f) | Do. |
| 37 | DMNA | Pd/CaCO₃ | 6 | 55–60 | do | 8.3 | 19 | 76 | .16 | | do | (e) | Do. |
| 38 | DMNA | Lump Ni "R" | 6 | 55–60 | do | 4.0 | 63 | 41 | .32 | 7.7 | do | Pure | Do. |
| 39 | DMNA | Pt/C | 6 | 55–60 | do | 2.1 | 35 | 87 | .19 | 16 | do | do | Do. |
| 40 | DMNA | Co "R" | 12 | 55–60 | do | 3.0 | 58 | 33 | .19 | 900 | do | do | Do. |
| 41 | DMNA | Ir/C | 6 | 55–60 | do | 2.5 | 48 | 31 | | 30 | do | do | Do. |
| 42 | DMNA | Pd/C | 6 | 55–60 | do | 3.3 | 100 | 40 | | 900 | do | do | Do. |
| 43 | DANA | Pd/C | 6 | 55–60 | do | 3.3 | 100 | 30 | | 1,000 | do | do | Do. |
| 44 | DNP | Pd/C | 6 | 5–10 | do | 3.3 | 71 | 51 | .82 | 1,000 | do | do | Do. |
| 45 | DMNA | Pd/C | 6 | 55–60 | 75° | 0.87 | 65 | 11.5 | 1.1 | 1,000 | do | do | Do. |
| 46 | DMNA | Pd/C | 6 | 55–60 | 90° | 0.60 | 54 | 91.4 | 1.25 | 1,000 | do | do | Do. |
| 47 | DMNA | Pd/C | 6 | 55–60 | 20° | 3.67 | 100 | 0 | | 1,000 | do | do | Do. |
| 48 | DMNA | PtO₂ | 6 | 55–60 | Room | 20.0 | | | | 40 | do | do | Acetic acid solvent. |

DMNA—Dimethylnitrosamine.   DENA—Diethylnitrosamine.   NP—Nitrospiperidine.   DANA—Diamylnitrosamine.   DNP—Dinitrospiperazine.

a Moles of nitrosamine in reactants−moles of nitrosamine in product / Moles of nitrosamine in reactants ×100.

b Moles of hydrazine in product / Moles of nitrosamine converted ×100.

c Crude.
d Crude nitrosamine fractionated in column having equivalent of 1 theoretical plate.
e Crude nitrosamine fractionated in column having equivalent of 2 theoretical plates.
f Crude nitrosamine fractionated in column having equivalent of 4 theoretical plates.
g Same as (f) but allowed to stand in air 2 weeks before use.
h Expressed as mole fraction nitrosamine converted per hour.

The hydrazine may then be readily obtained by a simple distillation. Hydrocarbon and chlorinated hydrocarbon solvents generally may be employed as the reaction medium. In fact, it may be desirable to employ a hydrocarbon solvent such as toluene since the lower hydrazines are only slightly soluble in this medium whereas the nitrosamines are very soluble and the product may then be recovered from a concentrated solution of the water formed in the reaction. In this way it is possible to conduct the reaction in a dilute solution which enhances the removal of heat and still recover the hydrazine product from a concentrated aqueous solution. Alcohols such as ethanol and the like may also be employed as a reaction medium.

In the table above examples are given to illustrate various embodiments of the invention, to demonstrate the criticality of the type of catalyst metal employed and the specific surface area of the catalytic material, and to demonstrate the effect of catalyst concentration (based on the amount of nitrosamine), temperature, pressure and time. In general, in all of the examples the reactants were charged into the indicated pressure vessel (either a Parr shaker bottle or a rocking autoclave) and agitated for the indicated time at the indicated temperature and pressure. In the various examples the charge of nitrosamine varied between 17 and 74 grams. Where the catalytic material is a supported catalyst, 5% by weight of the metal is employed with 95% by weight of the support. Except where otherwise indicated, the nitrosamine was initially purified by fractionation in a column having the equivalent of four theoretical plates and was then used in accordance with the invention within a period of three days. The percentage of reaction medium indicated is based upon the amount of nitrosamine charged to the reactor. In Example 25a, purified dimethylnitrosamine was employed. In Example 25b, the reactor was flushed three times with 10 p.s.i. air and the reaction was resumed. Example 49 is illustrative of a continuous process in accordance with the invention.

*Example 49*

Catalyst comprising 5% by weight of palladium supported on 6–16 mesh alumina is placed on a 40 mesh horizontal screen partition in a stainless steel reactor. The reactor is filled about 4/5 full with toluene and the remaining space is filled with water so that the catalyst is supported in the toluene layer which floats on the water layer. Dimethylnitrosamine is continuously introduced at the top of the reactor while hydrogen at 300 p.s.i.g. is continuously introduced through a gas dispenser disposed below the screen partition. The products of the reaction, dimethylhydrazine, water, dimethylamine and ammonia are only slightly soluble in toluene but are very soluble in water. The water layer, containing the reaction products, is continuously removed as dimethylnitrosamine is fed into the reactor.

From the foregoing examples it is apparent that supported palladium and supported platinum are considerably superior to the other operable catalysts. Furthermore, the superiority of supported catalyst is emphasized by the fact that in the runs employing 5% palladium on carbon (Example 5) the ratio of nitrosamine to palladium is 340:1, whereas in the run with platinum oxide (Example 2) the ratio of nitrosamine to platinum was 39:1. Example 8 establishes that ruthenium, although a member of Group 8, is not operable and that potassium perrhenate (Example 9), another well-known hydrogenation catalyst, is also inoperative. With regard to specific surface of the catalytic material, Examples 28 through 30 and 38 illustrate the inoperability of catalytic materials having a specific surface of below the necessary 15 square meters per gram in satisfactorily hydrogenating nitrosamines. Example 39 indicates that an acceptable conversion and yield and an acceptable zero order rate constant is obtained with a catalytic material (Raney nickel) having a specific surface of 16 square meters per gram.

The reaction rate and yield depend to some extent on catalyst concentration. Examples 5, 13 and 14 show the variation of yield and reaction rate with catalyst concentration when using a 5% palladium on carbon catalyst at 57 p.s.i.g. and 35° C.

The oxides of the operable catalystic metals are equivalent to the metals themselves, since under the reaction conditions of the invention, the oxides are reduced to the metals.

The above examples indicate that in the range of about 25° to 40° C. temperature has little effect on yield or reaction rate. The zero order rate constant is successively higher at 75° C. and 90° C. although the yields of hydrazine are lower at these temperatures. Thus, it is desirable to employ a temperature for a particular catalyst and pressure at which the maximum reaction rate is obtainable without inordinate attack upon the hydrazine product.

The hydrogenation of nitrosamines to the corresponding hydrazines is essentially a zero order reaction. The yield of hydrazine is slightly higher at higher pressures as will be seen from examining Examples 5, 10, 11 and 15 where palladium on carbon is employed, Examples 7 and 12 where rhodium on carbon is employed, and Examples 1 and 2 where platinum oxide is employed. Even though the highest yields are obtained at extremely high pressures, it is usually preferable, for economic reasons, to operate at 50 to 1000 p.s.i.g.

The foregoing disclosure and its illustrative examples establish that the process of the invention is a greatly improved process for the economic production of hydrazines from nitrosamines. Although the invention has been principally illustrated with individual batch reaction, the invention may also be employed in continuous reactions as illustrated by Example 49. Since modifications within the scope of the invention will become apparent to those skilled in the art, it is intended that the invention be limited only by the scope of the appended claims.

What we claim and desire to protect by Letters Patent is:

1. A process for the preparation of an unsymmetrical hydrazine which comprises purifying a nitrosamine by fractional distillation of same at a distillation column efficiency of at least four theoretical plates, and recovering a purified nitrosamine as a product fraction of said distillation; reacting the said purified nitrosamine with molecular hydrogen, at a pressure above atmospheric in the presence of a catalytic material having a surface area of at least about 15 sq. m./g. and comprising, as the catalyst, a Group VIII metal selected from the group consisting of palladium, platinum, rhodium, nickel, cobalt and iridium, to form the corresponding hydrazine; and recovering an unsymmetrical hydrazine, so produced, as product of the process.

2. A process of claim 1 wherein said catalytic material is palladium supported on carbon.

3. A process of claim 1 wherein said catalytic material is nickel.

4. A process of claim 1 wherein said catalytic material is platinum supported on carbon.

5. A process of claim 1 wherein said catalytic material is palladium.

6. A process of claim 1 wherein said catalytic material is platinum.

7. A process of claim 1 wherein the reaction of said nitrosamine with hydrogen is carried out at a temperature of from 20 to 75° C., in the presence of water as a solvent for the resulting reaction mixture, and at a pressure of from 50 to 10,000 p.s.i.g.

8. A process of claim 7 wherein the said nitrosamine is selected from the group consisting of dimethyl nitrosamine, diethyl nitrosamine, nitrosopiperidine, diamyl nitrosamine and dinitrosopiperazine.

9. A process of claim 8 wherein said nitrosamine is dimethyl nitrosamine.

References Cited by the Examiner

FOREIGN PATENTS 797,483    7/58    Great Britain.

OTHER REFERENCES

Blatt: Organic Synthesis, Collective, volume II, 1943, pages 211–213.

Ellis: Hydrogenation of Organic Substances, 3rd edition, 1930, page 87.

Fieser et al.: Advanced Organic Chemistry, 1961, page 281.

Fischer: Berichte, vol. 8, 1875, pages 1587–90.

Grillot: J.A.C.S., vol. 66, 1944, page 2124.

Gilman: Organic Chemistry, vol. 1, 2nd edition, 1943, pages 780, 781, 786, 787.

Grillot: "J. Am. Chem. Soc.," vol. 66 (1944), p. 2124.

Groggins: Unit Processes in Organic Synthesis, 4th edition, 1952, pages 519–520.

Lieber et al.: "J. Am. Chem. Soc.," vol. 59 (1937), pages 2287 to 2289.

Paal et al.: "Ber. Deut. Chem.," vol. 63b (1930), pages 57 to 60.

CHARLES B. PARKER, *Primary Examiner.*

H. J. LIDOFF, L. D. ROSDOL, R. L. CAMPBELL, *Examiners.*